US006569375B1

(12) United States Patent
McGlothlin et al.

(10) Patent No.: US 6,569,375 B1
(45) Date of Patent: May 27, 2003

(54) VULCANIZATION OF DIP-MOLDED RUBBER ARTICLES WITH MOLTEN MEDIA BATHS

(75) Inventors: Mark W. McGlothlin, San Diego, CA (US); Eric V. Schmid, San Diego, CA (US)

(73) Assignee: Apex Medical Technologies, Inc., San Diego, CA (US)

( * ) Notice: Subject to any disclaimer, the term of this patent is extended or adjusted under 35 U.S.C. 154(b) by 0 days.

(21) Appl. No.: 09/547,366

(22) Filed: Apr. 11, 2000

(51) Int. Cl.[7] .............................................. B29C 41/14
(52) U.S. Cl. ........................ 264/488; 264/301; 264/306; 264/236
(58) Field of Search ................................ 264/488, 642, 264/643, 650, 674, 234, 236, 216, 301, 305, 306

(56) References Cited

U.S. PATENT DOCUMENTS

| | | | |
|---|---|---|---|
| 732,360 A | * | 6/1903 | Lindsay |
| 1,152,372 A | * | 8/1915 | Miller |
| 2,173,734 A | * | 9/1939 | Sidnell |
| 2,324,735 A | * | 7/1943 | Spanel |
| 2,434,035 A | * | 1/1948 | De Laney et al. |
| 2,867,849 A | * | 1/1959 | Drew et al. |
| 2,868,859 A | | 1/1959 | Stott |
| 2,941,257 A | * | 6/1960 | Davis |
| 2,975,151 A | | 3/1961 | Ropp |
| 3,215,649 A | | 11/1965 | Preiss et al. |
| 3,626,052 A | | 12/1971 | Sisco et al. |
| 3,751,378 A | | 8/1973 | Cowperthwaite et al. |
| 3,755,232 A | | 8/1973 | Rodaway et al. |
| 3,855,561 A | * | 12/1974 | Esemplare et al. |
| 3,892,697 A | | 7/1975 | Burke |
| 3,919,442 A | * | 11/1975 | Esemplare et al. |
| 3,967,014 A | * | 6/1976 | Esemplare et al. |
| 4,027,060 A | * | 5/1977 | Esemplare et al. |
| 4,048,368 A | * | 9/1977 | Hale et al. |
| 4,334,043 A | * | 6/1982 | Groepper |
| 4,724,028 A | * | 2/1988 | Zabielski et al. ............ 156/256 |
| 4,808,442 A | * | 2/1989 | Verlaan et al. |
| 4,981,637 A | | 1/1991 | Hyer |
| 5,021,524 A | | 6/1991 | Dicker et al. |
| 5,084,514 A | * | 1/1992 | Szczechura et al. |
| 5,228,938 A | * | 7/1993 | Kansupada et al. |
| 5,281,570 A | * | 1/1994 | Hasegawa et al. |
| 5,310,811 A | | 5/1994 | Cottman et al. |
| 5,401,781 A | * | 3/1995 | Hagen |
| 5,569,740 A | | 10/1996 | Tanaka et al. |
| 5,580,942 A | | 12/1996 | Cornish |
| 5,585,459 A | | 12/1996 | Tanaka et al. |
| 5,610,212 A | | 3/1997 | Tanaka et al. |
| 5,872,173 A | | 2/1999 | Anand |
| 5,910,533 A | * | 6/1999 | Ghosal et al. |
| 6,012,268 A | * | 1/2000 | Schunk et al. |
| 6,016,570 A | * | 1/2000 | Vande Pol et al. |
| 6,019,922 A | * | 2/2000 | Hassan et al. |
| 6,021,524 A | | 2/2000 | Wu et al. |
| 6,028,142 A | * | 2/2000 | Garois |
| 6,031,042 A | * | 2/2000 | Lipinski |
| 6,217,815 B1 | * | 4/2001 | Sisbarro |
| 6,280,673 B1 | * | 8/2001 | Green et al. |
| 6,329,444 B1 | | 12/2001 | McGlothlin et al. |

FOREIGN PATENT DOCUMENTS

DE      197 46 676 A      4/1999

OTHER PUBLICATIONS

Long, Harry (Editor), Basic Compounding and Processing of Rubber, copy right 1985, Lancaster Press at Prince and Lemon Streets, Lancaster, Pennsylvania, p. 160.*
Database WPI Section Ch, Week 198947 Derwent Publications Ltd., London, GB; Class A32, AN 1989–345296 XP002182764 & JP 01 258917 A (Raytec KK), Oct. 16, 1989 abstract.
Database WPI Section CH, Week 199312 Derwent Publications Ltd., London, GB; Class A12, AN 1993–094685 XP002182765 & CN 1 062 539 A (Pingdu Emulsion Plant), Jul. 8, 1992 (Jul. 7, 1992) cited in the application abstract.

* cited by examiner

*Primary Examiner*—Mark Eashoo
*Assistant Examiner*—Geoffrey P. Shipsides
(74) *Attorney, Agent, or Firm*—Townsend and Townsend and Crew, LLP

(57) ABSTRACT

Pore-free rubber articles are prepared by dip-molding in a dipping medium that includes a vulcanizing agent, then by immersing the dip former in a heated liquid bath that is chemically inert. A particularly effective liquid bath is molten inorganic salt. In addition, the tensile properties of an article of vulcanized rubber can be improved to an unusually effective degree by immersing the already vulcanized article in a solution of a vulcanizing agent to cause the rubber of the article to absorb or imbibe the vulcanizing agent from the solution, and then immersing the rubber and the imbibed vulcanizing agent in a heated liquid bath to increase the degree of vulcanization.

27 Claims, No Drawings

VULCANIZATION OF DIP-MOLDED RUBBER ARTICLES WITH MOLTEN MEDIA BATHS

BACKGROUND OF THE INVENTION

1. Field of the Invention

This invention lies in the field of rubber articles, particularly those formed by dip-molding. In particular, this invention addresses methods of vulcanization of dip-molded rubber articles.

2. Background of the Invention

Natural rubber latex has been extensively used as a material of construction for elastomeric dip-molded medical devices and medical device components. Examples of medical devices and components made from natural rubber latex are surgical gloves, examination gloves, finger cots, catheter balloons, uterine thermal ablation balloons, catheter cuffs, condoms, contraceptive diaphragms, indwelling urinary drainage catheters, and male external urinary drainage catheters. Other examples will be apparent to those skilled in medicine and in the manufacture and use of these and similar medical devices. Dip-molding techniques are also used in making elastomeric devices non-medical uses. These include toy balloons, industrial gloves, household gloves, and other similar devices. These devices, both medical and non-medical, can also be formed from synthetic rubber latex materials rather than natural rubber. In some cases, synthetic materials are preferred, for example where natural rubber is deemed unsuitable for some reason or where the synthetic material offers an advantage.

In latex dip-molding processes, dip formers are dipped in a latex bath, then withdrawn from the bath, dried in hot air, and vulcanized in hot air. In some cases, the latex is pre-vulcanized, i.e., the rubber particles in the latex are partially or fully vulcanized prior to the dipping step. A prevulcanized latex produces a film with improved wet and dry gel strengths, and when further vulcanization is performed after dipping and hot air drying, the tensile properties are improved. An advantage of prevulcanization is a reduction in the process time by lessening or eliminating the time required for the post-dip vulcanization. In some dip-molding processes, a chemical coagulant is included in the latex or on the dip former, and heat-sensitized coagulant dipping methods are applied to produce articles have a greater film thickness. Multiple dips are also used in some processes. Details of these and other methods are well known to those skilled in the art of latex dip molding. Further descriptions of the process and its variations are found in Pendle, *Dipping with Natural Latex*, published by The Malaysian Rubber Producers' Association (1995).

Vulcanization performed on the latex film after the dip former is removed from the bath serves to form covalent bonds both within the individual rubber particles and between coalesced rubber particles. A problem with vulcanization both at this stage and prior to the dip is that the outer surfaces of the particles have greater exposure to the vulcanizing agents than the particle interiors, resulting in a case-hardening effect and a lack of uniformity in the rubber.

In dip-molding processes for rubber latices, sulfur is the primary vulcanizing agent, although various accelerators, activators, sulfur donors, and boosters are frequently included as well. A description of prevulcanization methods and formulations for both natural and synthetic rubber latices is found in Blackley, D.C., *Polymer Latices: Science and Technology*, 2d Edition, Vol. 2, Chapter 13 (Chapman and Hall, 1997). Prevulcanization methods performed without sulfur are those utilizing free radical crosslinking, which can be achieved by various means, including high energy irradiation in the presence of a chemical sensitizer. Natural latex prevulcanized in this manner is referred to as "radiation vulcanized natural rubber latex" (RVNRL). Descriptions of such latices and the vulcanization processes used in their preparation are found in Zin, W.M.B.W., "Semi industrial scale RVNRL preparation, products manufacturing and properties," *Radiat. Phys. Chem.*, 52(1–6), pp. 611–616 (1998).

Rubber films from RVNRL are produced by simply casting the latex into films and then drying the films. No vulcanization is done after the film is cast, and none can be done unless curative agents are subsequently added. Films made by this process have tensile strengths of up to 27.1 megapascals (3930 psi). While this meets the requirements of many dip-molded rubber devices, such as surgical gloves for example, the tensile strength of these films is not as high as that achieved in many sulfur-vulcanized films where a post-vulcanization step (after the dip stage) is included. The RVNRL films are also lower in the value of the 100% tensile modulus than sulfur-vulcanized films. The RVNRL films also suffer from a lack of any means to achieve true particle integration by covalent bonds. This makes it difficult to form a truly integrated, pore-free latex rubber film from RVNRL. A further disadvantage is the need for access to an irradiation facility, which may not be in a location that is convenient to many rubber manufacturers and which adds considerably to the cost of manufacture.

An alternative means of prevulcanization of latex by free radical crosslinking is that which involves the use of organic peroxides and hydroperoxides. Latex that is prevulcanized with these materials is referred to as "peroxide vulcanized natural rubber latex" (PVNRL). Descriptions of such latices and methods for preparing them are found in U.S. Pat. No. 2,868,859, issued Jan. 13, 1959, to G. Stott, entitled "Curing Natural Rubber Latex With a Peroxide." The process disclosed in this patent involves superheating natural rubber latex in the presence of 2% (based on dry rubber weight) ditertiary butyl peroxide in a pressure vessel at a temperature of 170° C. for fifteen minutes. The latex was then cooled, and the films cast and dried to yield vulcanized rubber films with a tensile strength as high as 251 kg/cm$^2$ (3739 psi). The film was formed simply by drying, with no post-drying vulcanization. Unfortunately, utilization of this process on a commercial scale would require large and expensive heated pressure vessels, and prevulcanization is a necessary part of the process.

Latex prevulcanized with a hydroperoxide rather than an organic peroxide is described in U.S. Pat. No. 2,975,151, issued Mar. 14, 1961, to W. S. Ropp, entitled "Vulcanization of Latex With Organic Hydroperoxide." In this patent, natural rubber latex is prevulcanized by superheating under pressure at 250° F. (121° C.) for about one hour with cumene hydroperoxide. The resulting cooled latex is cast into a film, then air dried. The product had a maximum tensile strength of 2775 psi. As in the Stott patent, the utilization of this process on a commercial scale would require large scale heated pressure vessels, and the tensile strength is not nearly as good as that of a sulfur-vulcanized latex or of the organic peroxide prevulcanized latex of Stott.

The use of hydrogen peroxide as a prevulcanizing agent with an activating chemical is disclosed in U.S. Pat. No. 3,755,232, issued Aug. 28, 1973, to B. K. Rodaway, entitled "Vulcanization of Latex With Organic Hydroperoxide." The method of this patent is performed at lower temperatures without the use of pressure vessels. The patent cites an example in which a natural rubber latex is prevulcanized by this method, cast into a film and dried, to yield a product with a tensile strength of 124 kg/cm$^2$ (1760 psi). Thus, despite its advantages this process produces latex films of interior strength. The possibility of adding a sulfur curative system to the latex after prevulcanization to permit post-casting vulcanization is suggested, but this would involve the use of sulfur curative chemicals, which peroxide processes are generally intended to avoid. In further examples, curing of polychloroprene and other synthetic latices is performed with hydrogen peroxide and an activator, the products in each case having inferior tensile properties.

Further disclosure of technology forming the background of the present invention is found in U.S. Pat. No. 3,892,697, issued Jul. 1, 1975, to O. W. Burke, entitled "Preparation of Crosslinked Polymer Latex From Aqueous Emulsion of Solvent/Polymer Solution of Precursor Latex Particle Size." In the process disclosed in this patent, dicumyl peroxide is mixed with a synthetic polyisoprene latex under 6000 psi pressure, and the mixture is subjected to an unspecified elevated temperature for an unstated period of time. There is no disclosure of film formation.

Still further methods forming the background of the invention are those known as "continuous vulcanization in liquid baths" (LCM Vulcanization) which are used on extruded rubber profiles. In LCM Vulcanization, a solid constant profile shape is extruded, then submerged in a hot liquid bath such as molten salt, hot oil, or melted lead, or in a hot fluid medium such as fluidized sand particles. Essentially all molecular oxygen is excluded from the curing environment. The use of the hot liquid bath or fluid medium is to provide very rapid heat transfer rates to thin-wall extruded rubber profiles. Descriptions of various LCM Vulcanization methods are found in Hoffman, *Rubber Technology Handbook*, pages 394–398 (Hanser Publishers, 1994), and in U.S. Pat. No. 4,981,637, issued Jan. 1, 1991, to M. L. Hyer, entitled "Method of Forming an Improved Wiper Blade." These references do not disclose application of the process to dipped films.

Latex articles formed by dip molding must be pore-free if the passage of pathogens or other unwanted substances through the article walls is to be prevented. Pore-free walls require good integration and adhesion between the rubber particles of the latex. Many attempts have been made to achieve this, but it remains a difficult goal. Excessive vulcanization for example tends to inhibit particle integration. A simple means of determining the extent of prevulcanization is a test known as the chloroform coagulation test. A description of this test can be found in *The Vanderbilt Latex Handbook*, 3d Edition, page 110 (R.T. Vanderbilt Company, Inc., Norwalk, Conn., USA).

All patents and publications cited in this specification are incorporated herein by reference.

SUMMARY OF THE INVENTION

It has now been discovered that pore-free rubber articles can be prepared by dip-molding processes by including vulcanizing agent(s) in the dipping medium and vulcanizing the wet film by immersing the dip former in a heated liquid bath that is chemically inert. The temperature of the heated bath will be sufficiently high to cause at least a partial melting and/or softening of any coalesced rubber particles in the film while vulcanizing the film, and the time needed to effect vulcanization under these conditions is considerably less than that typically used for vulcanization in hot air. The resulting film is coherent and essentially pore-free.

Another aspect of this invention resides in the discovery that the tensile properties of an article of vulcanized rubber can be improved to an unusually effective degree by immersing the already vulcanized article in a solution of a vulcanizing agent to cause the rubber of the article to absorb or imbibe the vulcanizing agent from the solution, and then immersing the rubber and the imbibed vulcanizing agent in a heated liquid bath that is substantially free of molecular oxygen and chemically inert. After recovery of the article from the bath, the tensile properties are considerably greater than those that the product would have if the same amount and type of vulcanizing agent were included in the original vulcanization.

This invention is useful in the manufacture of articles of all rubber materials, both natural and synthetic. For certain aspects of this invention, notably those that reside in the use of the heated liquid bath for a single-stage vulcanization after dip-molding, the preferred rubber materials are those other than cis-1,4-polyisoprene.

Among the many advantages of this invention is a faster vulcanization rate without the risk of undesirable oxidation of the dipped parts. The invention also offers superior particle integration and thus more coherent latex films by partially melting the particles as they are being crosslinked and heating them more thoroughly, which reduces the tendency of the particles toward case hardening. Prevulcanization, i.e., vulcanization performed on the dipping liquid prior to the dip stage, can be eliminated in many cases, and this offers advantages for latices that are peroxide cure systems or sulfur cure systems where prevulcanization is used in part to reduce the cure times and to reduce the quantity of nitrosamines that may be released during dip molding operations. Alternatively, the postvulcanization of the invention, referring to its occurrence subsequent to the dip stage, can improve the tensile properties of the product without the need for the addition of sulfur-based chemicals. Postvulcanization can also be performed using a different reaction than that used for the prevulcanization. For example, postvulcanization with the use of peroxides can be performed on latices that are prevulcanized by sulfur, by peroxide, or by radiation. In systems that are susceptible to nitrosamine formation, the invention reduces or eliminates the amount of nitrosamines that are formed. When polychloroprene latices, nitrile latices or mixtures of the two are used, postvulcanization by use of organic peroxides can be achieved with very small amounts of the peroxides. With peroxide-based and radiation-based vulcanization systems, the use of the present invention provides products with a 100% tensile modulus that is higher than has been previously obtained with such systems, and yet with no loss of tensile strength. With sulfur-based systems, the high-temperature, oxygen-free environment helps to prevent the degradation that is caused by hydroperoxides that are typically generated during hot air vulcanization. Such degradation is responsible in part for the aging of latex. Use of the invention in non-sulfur-containing systems such as peroxide-based systems results in products with a longer shelf life. Still further, the elimination of the need for hot air curing and its inherent inefficiencies offers considerable savings in energy, since hot media baths are easily insulated. Further energy savings are also available when prevulcanization and maturation are eliminated. The means by which these and other objects and advantages are achieved, as well as particulars of the process and its preferred embodiments, will be evident from the description that follows.

DETAILED DESCRIPTION OF THE INVENTION AND SPECIFIC EMBODIMENTS

The liquid bath in which the dip former and film are immersed subsequent to the dip stage of the process is a heated liquid that provides rapid heat transfer to the film. Further properties of liquid media that are most desirable and therefore preferred for this purpose are the lack of a tendency to migrate or diffuse into the film on the dip former (unless the medium itself is a desirable constituent of the film), the quality of being stable with respect to the surrounding environment (both the atmospheric environment and the rubber-forming material as well as the various species that may be compounded with the material), and the quality of remaining liquid at the vulcanization temperature. Examples of liquid media that can be used for this purpose are molten inorganic salts, oils, glycols, liquified metals, water, and brine solutions. Preferred among these are molten inorganic salts, silicone oils, and glycols, and the most preferred are molten inorganic salts. Examples of suitable molten inorganic salts are nitrates, nitrites, carbonates, sulfates, phosphates, and halides of potassium, sodium and lithium, as well as combinations of salts of this group. Salt combinations of this type are commercially available from such suppliers as Heatbath Corporation, Detroit, Mich., USA; and Hubbard-Hall Inc., Inman, S.C., USA. An example of a suitable commercial salt mixture is QUICK CURE 275 of Hubbard-Hall, Inc., the main components of which are potassium nitrate (approximately 50% by weight), sodium nitrite (approximately 30% by weight), and sodium nitrate (less than 10% by weight), with a molten temperature range of about 315° F. to 650° F. (157° C. to 343° C.). Other examples are PARCURE 275 and PARCURE 300 of Heatbath Corporation.

The heated liquid medium bath is preferably used at a temperature that significantly exceeds the temperatures used in hot air vulcanization methods of the prior art, but not so high as to have an adverse effect on the stability of the rubber being vulcanized. When the rubber is natural rubber, for example, it is best not to exceed 450° F. (232° C.), and in the case of styrene butadiene rubber or polychloroprene latex, it is best not to exceed 575° F. (302° C.). A preferred temperature range for the full scope of this invention is about 100° C. to about 350° C. For polychloroprene and styrene-butadiene rubber, a preferred temperature range is about 150° C. to about 300° C., while for natural rubber a preferred temperature range is from about 150° C. to about 235° C. The choice of operating temperature and exposure time will be subject to considerations both of achieving a rapid cure and of maintaining an economic use of energy and other process costs. Other considerations may be present with particular types of rubber and particular curing systems. In organic peroxide curing systems, for example, the preferred temperature and time will be those that result in cleavage of essentially all of the peroxide present. This is generally achieved in six to eight half-lives. In sulfur-based curing systems, the avoidance of reversion and toxicity are often considerations. In all cases, however, the time necessary for full curing is much less than that required in hot air curing processes of the prior art. A presently preferred cure condition is nine minutes at 350° F. (177° C.).

This invention is applicable to a wide range of rubber and rubber substitute compositions, including both latices and organic solutions.

Of the latices, the one most commonly used is natural rubber. Natural rubber can be obtained from several sources, including *Hevea brasiliensis, Parthenum argentatum* (commonly known as "guayule"), and *Ficus elastica* rubber trees. Methods for obtaining natural rubber latices from non-Hevea sources are described in U.S. Pat. No. 5,580,942, issued Dec. 3, 1996 to Cornish ("Hypoallergenic Natural Rubber Products From Parthenum Argentatum (Gray) and Other Non-Hevea Brasiliensis Species"). Natural rubber latex is available in several grades, including high ammonia latex, low ammonia latex, and others. All such varieties are suitable for use in the present invention. This invention also extends to natural rubber latices that have been processed to reduce the amount of proteins present in the latices. Some of these processes include centrifuging to separate and remove water, and others include double centrifuging, in which an initial centrifuging is followed by the addition of water and a second centrifuging. Still other processes involve the use of enzymes to digest the proteins. Descriptions of enzyme methods are found in U.S. Pat. Nos. 5,610,212 ("Means for Mechanically Stabilizing Deproteinized Natural Rubber Latex," Mar. 11, 1997), 5,569,740 ("Deproteinized Natural Rubber Latex and Its Production Process," Oct. 29, 1996), and 5,585,459 ("Process for Producing Raw Rubber," Dec. 17, 1996), to Tanaka et al. An example of a commercially available deproteinized rubber latex is ALLOTEX, obtainable from Tillotson Healthcare Corporation, Rochester, N.H., USA.

Synthetic rubber latices in general are likewise usable in the practice of this invention. Examples are ethylene-propylene-diene terpolymer, styrene isoprene rubber, styrene butadiene rubber, styrene isoprene butadiene rubber, polybutadiene rubber, polychloroprene, nitrile rubber, styrene block copolymers, and butyl rubber. An example of a polychloroprene latex is NEOPRENE 750, available from E.I. DuPont de Nemours, Inc. Wilmington, Del., USA, and an example of a nitrile latex is NITRILE LATEX #O17071, available from Heveatex Corporation, Fall River, Mass., USA. Mixtures of latices can also be used. Some of these mixtures are described in U.S. Pat. No. 3,626,052, issued Dec. 7, 1971, to Sisco et al., entitled "Polyisoprene-Neoprene Meteorological Balloons," where polychloroprene latex is mixed with polyisoprene latex to produce meteorological balloons.

This invention also extends to polymer dispersions that are used in a manner similar to rubber latices. One example is an aqueous dispersion of a polyurethane thermoplastic elastomer. A commercially available dispersion of this type is INTACTA, available from The Dow Chemical Company, Midland, Mich., USA. Polymer dispersions such as this lack carbon-carbon double bonds and hence are not susceptible to sulfur-based crosslinking. For these dispersions, embodiments of the present invention that use curing systems other than those that are sulfur-based can be used. Polyurethane products such as medical examination gloves that are formed by the process of this invention exhibit increased resistance to solvents.

In addition to latices and polymer dispersions, the present invention also applies to organic solutions. The organic solvents used in forming these solutions are any solvents that are inert to the rubber, rubber substitute or polymer, and that are readily removable from the dip-molded film by evaporation. The solvent is preferably an aliphatic hydrocarbon, saturated or unsaturated, linear, branched or cyclic, or ethers, esters, alcohols or amines. Typical solvents are aliphatic hydrocarbons containing 5 to 8 carbon atoms, such as pentane, pentene, hexane, heptane, cyclohexane, and cyclopentane, and heterocyclic compounds such as tetrahydrofuran.

A wide variety of vulcanizing agents can be used in the practice of this invention. Useful vulcanizing agents include organic peroxides, sulfur-containing compounds, selenium-containing compounds, and tellurium-containing compounds. Organic peroxides, for example, may be used singly or in combination, and the most common types are dialkyl peroxides, peroxyketals, and dialkyl peroxides. Preferred organic peroxides are the dialkyl peroxides, particularly dicumyl peroxide, available from Hercules Incorporated, Wilmington, Del., USA, as DICUP R. Other useful dialkyl peroxides are 2,5-dimethyl-di-(t-butylperoxy)hexane, di-t-butylperoxide, t-butylcumyl-peroxide, bis(t-butylperoxyisopropyl)benzene, butyl4,4-bis(t-butylperoxy) valerate, 2,5-bis(t-butylperoxy)-2,5-dimethylhexane, 2,5-bis(t-butylperoxy)-2,5-dimethyl-3-hexyne, t-butyl 3-isopropenylcumyl peroxide, bis(3-isopropenylcumyl) peroxide, 1,1-bis(t-butylperoxy)-3,3,5-trimethylcyclohexane, t-butylperoxybenzoate, and bis(2,4-dichlorobenzoyl) peroxide.

Coagents and other additives are often used in conjunction with the organic peroxides to achieve products having particular properties. Certain coagents also add to the crosslinking efficiency of the peroxides by causing a single peroxide radical to produce more than one carbon-carbon crosslink. Coagents can also be integrated into the polymer network by covalent bonds to enhance certain properties of the polymer, such as elongation and tear strength. Some of these coagents are based on acrylate and methacrylate chemistry. All however are suitable for inclusion in the methods and products of the present invention. Examples of suitable coagents are SARET 516, SARET 517, SARET 521, and SARET 634, available from Sartomer Company, Inc., Exton, Pa., USA. These coagents are multifunctional salts of acrylic and methacrylic acids. Of this group of coagents, SARET 634 (whose primary ingredient is zinc dimethacrylate) and SARET 521 (whose primary ingredients are difunctional acrylate esters) are the most preferred. Trimethylolpropane trimethacrylate another example. A more extensive description of such coagents is found in U.S. Pat. No. 3,751,878, issued Aug. 7, 1973 to Cowperthwaite et al., entitled "Inhibiting Prevulcanization of Rubber With Polyfunctional Methacrylate Monomers as Cross-Linking Coagents with Peroxides," and U.S. Pat. No. 5,310,811, issued May 10, 1994 to Cottman et al., entitled "Free Radical Cured Rubber Employing Acrylate or Methacrylate Esters of Hydroxybenzene and Hydroxynaphthalene Compounds as Co-Curing Agents."

Free-radical vulcanizing agents other than peroxides are disclosed in U.S. Pat. No. 3,892,697, referenced above.

Sulfur-based vulcanization systems include both small sulfur-containing molecules and sulfur-containing polymers. Examples of sulfur-based vulcanization chemicals are:

- mercaptothiazoles, for example 2-mercaptobenzothiazole and its salts, notably its zinc salt
- thiuram sulfides and disulfides, for example tetraethylthiuram monosulfide, tetrabutylthiuram monosulfide, tetramethylthiuram disulfide, and tetraethylthiuram disulfide,
- guanidines
- thiourea and substituted thioureas
- thiocarbanilides and substituted thiocarbanilides, for example o-dimethyl-thiocarbanilide and its isomers and alkyl homologs
- zinc alkyl dithiocarbamates, for example zinc dimethyl dithiocarbamate, and accelerators containing these materials
- sodium or potassium dimethyl dithiocarbamate
- selenium dialkyl dithiocarbamates, for example selenium diethyldithiocarbamate
- 2-benzothiazyl-N,N-diethylthiocarbamyl sulfide
- xanthates such as dibutyl xanthogen disulfide and xanthogen polysulfide
- alkyl phenol sulfides
- dipentamethylene tetrasulfide
- sulfur-containing polymers such as Thiokol VA-3
- 4,4-dithiomorpholine
- miscellaneous disulfides such as bensothiazyl disulfide and bis(dimethylthiocarbamoyl) disulfide When the dip-molded articles of this invention are intended for use in contact with human skin, the preferred compounding ingredients are those that produce films that are biocompatible. Examples of compounding ingredients that serve this purpose for sulfur-vulcanized systems are xanthogen compounds such as diisopropyl xanthogen polysulfide, dibenzyldithiocarbamate, and higher alkyl zinc dithiocarbamates. For peroxide vulcanized systems, the preferred compounding ingredient is dicumyl peroxide.

Reinforcing agents and other additives are also included in some embodiments of the invention. Examples of reinforcing agents are fumed silica, carbon black, and chopped fibers. The use of cut fibers for example to improve the tear strength of medical gloves is disclosed in U.S. Pat. No. 6,021,524, issued Feb. 8, 2000, to Wu el al., entitled "Cut Resistant Polymeric Films," and the use of fumed silica to improve the tear strength of dipped films is disclosed in U.S. Pat. No. 5,872,173, issued Feb. 16, 1999, to Anand, entitled "Synthetic Latex Compositions and Articles Produced Therefrom." Antioxidants and antiozonants may also be included to protect against environmental aging. Pigments and dyes may also be included, as may any of the other additives known to those skilled in the art of the formulation and manufacture of rubber devices.

An illustrative procedure for latex dip molding and curing in accordance with the present invention is as follows:

1. Either a natural rubber or a synthetic rubber latex is compounded with vulcanizing agent(s) and possibly an antioxidant, a stabilizer or both. If organic peroxide vulcanization is used, it will often be sufficient to simply add to the latex a dispersion that contains an organic peroxide.
2. Prevulcanization of the latex at this stage is optional and not required for all embodiments of this invention. When used, prevulcanization can improve the wet gel strength.
3. A dip former is optionally coated with a chemical coagulant by dipping the former into a bath of a coagulant-containing liquid, then withdrawing the former and drying it.
4. The dip former, with or without the coagulant coating, is dipped in a bath filled with the compounded latex.
5. The dip former is slowly withdrawn from the bath. If the former had a coagulant coating, it now has a wet latex gel on its surface. If no coagulant coating was applied, the former will have a liquid latex film on its surface.
6. Excess water in the latex film on the dip former surface is removed, generally by evaporation in a hot air convection oven with either sweep gas or a partial vacuum. The process can be supplemented with infrared, microwave, or radiofrequency radiation, or any other type of energy to expedite the evaporation. Vacuum drying is advantageous since it avoids the need for exposure of the dried latex to air at an elevated temperature prior to vulcanization.
7. The latex is cured by immersion of the dip former into the heated liquid media bath for sufficient time to cure the latex.

8. The dip former with the cured latex film is withdrawn from the heated medium bath and cooled either in air or in a stream of water. Water may be used to rinse off any excess solidified heat transfer medium such as solidified salt.

9. The vulcanized latex article is manually or mechanically stripped from the dip former.

An illustrative procedure for solvent dip molding and curing in accordance with the present invention is as follows:

1. Solid granules of synthetic or natural rubber elastomer are dissolved in a suitable solvent to form a cement. Suitable compounding agents are dispersed or dissolved in the cement. Compounding agents similar to those used in the latex processes, including organic peroxides, can be used.

2. No prevulcanization is necessary, as all compounding gents are uniformly dispersed in the cement. The cement is placed in a dip tank, and a dip former is dipped in the cement.

3. The dip former is slowly withdrawn from the dip tank to leave a film of the cement over the surface of the dip former.

4. Solvent is evaporated from the dip former to leave a uniform polymer film on the surface. Removal of the solvent can be achieved by ambient or hot air drying.

5. The polymer film is cured by immersion of the dip former in a heated liquid medium bath. After a suitable period of time, the dip former is withdrawn from the bath and cooled in air or a stream of water.

6. The dip former is then soaked in water to help break the adhesion between the film and the dip former.

7. The vulcanized latex article is manually or mechanically stripped from the dip former.

While the present invention virtually eliminates the need for prevulcanization and maturation of the compounded latex or solution, prevulcanization is useful with latices that would otherwise have an exceptionally low wet or dry gel strength. Prevulcanization can be done by any conventional method. Such methods include, but are not limited to, sulfur prevulcanization, peroxide prevulcanization, and prevulcanization by high energy irradiation, all of which may be performed as they are in the prior art. Good wet gel strength is useful in preventing cracks from forming in the film as the film is being dried. In the case of natural rubber, both wet and dry gel strengths are generally adequate without prevulcanization. The gel strengths of some synthetic latices are lower, however, and prevulcanization may improve the processing, but is not essential. Prevulcanization by high energy irradiation can also serve to reduce the amount of vulcanization chemicals needed and hence the levels of undesirable residual chemicals in the final product.

It is often useful to determine the extent to which a dipped film or article has been vulcanized. A commonly used method is to cut out a circular disk of the cured film and measure the change in diameter upon immersion of the disk in a solvent bath. A detailed explanation of this test and its use with polyisoprene latex is found in U.S. Pat. No. 3,215,649, issued Nov. 2, 1965, to Preiss et al., entitled "Synthetic Latex." Similar test methods are available for other types of vulcanized polymers, and are well known to those skilled in the art.

After the dip-molded part is vulcanized, further vulcanization can be performed as an optional means of further improving the properties of the product. A preferred method is to imbibe the vulcanized film with a further amount of vulcanizing agent(s), followed by a second beat treatment in a hot liquid bath. The vulcanizing agent may be the same or different than that used in the first stage (immediately following the dip-molding stage). Likewise, the hot liquid bath may be the same or different than that used earlier.

For films vulcanized with dicumyl peroxide, for example, the cured rubber film can be immersed in a solution of dicumyl peroxide in a solvent such as n-pentane, n-hexane, toluene, or ethyl acetate. The peroxide solution significantly swells the film, thereby causing the dicumyl peroxide and solvent to uniformly penetrate the cured film. The film is then withdrawn from the solution and the solvent evaporated, leaving a predictable amount of dicumyl peroxide in the film. The film is then immersed in a hot liquid bath as before for an appropriate period of time, which may be the same period of time used after the initial dip in the latex. The film is then removed and rinsed in water. Other vulcanizing agents or combinations of vulcanizing agents can be substituted to similar effect.

The physical properties of crosslinked articles that are vulcanized in this two-step postvulcanization process are different from, and frequently better than, those of crosslinked articles in which only a single postvulcanization has been performed. This second postvulcanization thus permits a reworking of or an enhancement of the properties of films that have already been vulcanized. This is particularly useful, for example, in the case of right-heart catheter balloons, where the second postvulcanization can achieve significantly higher levels of air inflation and burst pressures. Returning to the dicumyl peroxide example, a typical range of dicumyl peroxide for a high quality right heart catheter is about 1 to about 1.5 phr (parts hundred ratio, or parts per hundred weight of dry rubber). Of this, 0.2 to 0.5 extra phr of dicumyl peroxide can be imbibed with a subsequent heating step to achieve a significant improvement in the air inflation and burst properties.

The following examples are offered for purposes of illustration, and are not intended to limit the scope of the invention. All patents and publications cited in these examples are hereby incorporated herein by reference.

EXAMPLE 1

COMPARATIVE

This comparative example demonstrates the degradation of properties that occurs when latex films are dip molded from organic peroxide-containing latices and then vulcanized in an oxygen-bearing environment.

A 40% solids dicumyl peroxide emulsion was prepared by combining the following ingredients:

| | |
|---|---|
| Dicumyl peroxide | 100 parts by weight |
| Toluene | 35 parts by weight |
| Oleic acid | 5.6 parts by weight |
| De-ionized water | 101 parts by weight |
| 30% Aqueous KOH | 2.6 parts by weight |

Natural rubber latex at a concentration of 60 weight percent solids was used, supplied by Diversified Compounders, Inc., Los Angeles, Calif., USA. An aqueous coagulant containing approximately 35% calcium nitrate, 0.5% Igepal CO-630 surfactant (Rhone-Poulenc, Cranbury, N.J., USA), and 64.5% deonized water (all by weight) was also used. Clear glass tubes 32 mm in dianeter were used as dipping formers.

To 1 kg of the natural latex was added 21 g of the dicumyl peroxide emulsion. The resulting composition was mixed under medium shear for thirty minutes with a laboratory mixer. The mixture was then rolled for thirty minutes on a laboratory roll mill, then degassed for ten minutes at 0.3 atmosphere absolute pressure. This yielded approximately 1 liter of natural rubber latex formulated with 1.4 phr dicumyl peroxide.

The glass formers were dipped in the coagulant solution, allowed to dwell for five seconds, withdrawn, and then, without drying, were dipped in the formulated latex. The formers were allowed to dwell in the latex for a period of five seconds, then slowly withdrawn. The formers were then dried in a hot air oven at 60° C. for sixty minutes. After drying, the formers were placed in a hot air curing oven at 110° C. One former was withdrawn every ten minutes and the latex film examined. Observations at ten-minute intervals over a fifty-minute period were thus made, and the results are listed in Table I.

TABLE I

Comparative Example:
Appearance and Physical Properties of Dipped Films
vs. Time Spent in Hot Air Curing Oven at 110° C.

| Time (minutes) | Observations |
| --- | --- |
| 10 | Clear, non-tacky film; good green tensile strength |
| 20 | Clear, non-tacky film of darker brown shade; green tensile strength lower than that at 10 minutes |
| 30 | Film very dark in color although still non-tacky; tensile strength very low, crumbled on touch |
| 40 | Film very dark in color and slightly tacky; no tensile strength |
| 50 | Film very dark in color and tacky (more than slightly); no tensile strength |

The observations in Table I indicate that the dipped latex films prepared from organic peroxide formulated latices cannot be successfully cured in a hot air oven due to the interaction with the oxygen in the curing environment.

EXAMPLE 2

PROCESS ACCORDING TO THE INVENTION: NATURAL RUBBER LATEX

This example illustrates the process of the present invention using the same materials as those of Example 1 but substituting a molten salt bath cure for the hot air cure. A coagulant solution in ethanol was used, containing approximately 20% calcium nitrate, and 0.5% Igepal CO-630, all by weight, the balance denatured ethanol.

To 1 kg of natural rubber latex was added 19.5 g of the dicumyl peroxide emulsion, and the resulting composition was mixed under medium shear for thirty minutes on a laboratory mixer. In addition, fumed silica was added at 2 phr in the form of a 15% (by weight) aqueous dispersion (CABO GUARD T-122) supplied by Cabot Corporation, Boston Mass., USA. After thirty minutes of mixing, the solution was rolled for thirty minutes on a laboratory roll mill, then degassed for ten minutes at 0.3 atmosphere absolute pressure. This yielded approximately 1 liter of natural rubber latex formulated with 1.3 phr dicumyl peroxide.

The glass former was dipped into the coagulant solution, then dried for five minutes at 40° C., then slowly dipped into the formulated latex where the former was allowed to dwell for five seconds. The former was then slowly withdrawn and dried at 60° C. for sixty minutes. Once drided, the former and its adherent film were immersed in a molten salt bath for nine minutes at 350° F. (177° C.). The film was then removed from the salt bath, rinsed, stripped and readied for tensile testing. The film appeared translucent-to-clear and sightly amber in color. Its was more transparent than many sulfur-vulcanized rubber films.

A standard condom ring tensile specimen was prepared and tested in accordance With ASTM specification D3492. The tensile values obtained are listed in Table II:

TABLE II

Invention Example - Natural Rubber: Tensile Modulus

| % Elongation | Modulus (psi) |
| --- | --- |
| 50 | 78 |
| 100 | 114 |
| 200 | 178 |
| 300 | 264 |
| 400 | 313 |
| 500 | 1292 |
| 600 | 2954 |
| 700 | not recorded |
| At break (ultimate tensile strength) | 5659 |

The ultimate elongation of the test specimen was 706 percent.

These results show that the tensile strength of this material is outstanding when compared with previous published values for natural rubber latex vulcanized by any known means. Comparison of these results with ASTM standard D3577-98 ("Standard Specification for Rubber Surgical Gloves") and ASTM standard D3492 ("Standard Specification for Rubber Contraceptives") indicates that the film produced in this example can meet the necessary tensile strength requirements for both surgical gloves and condoms.

EXAMPLE 3

PROCESS ACCORDING TO THE INVENTION: POLYCHLOROPRENE

This example illustrates the process of the present invention as applied to polychloroprene, using procedures similar to those of the preceding examples. The polychloroprene was a latex containing 60 weight percent solids, supplied by DuPont-Dow Elastomers, LLC, Wilmington, Del., USA and is sold commercially as NEOPRENE 750.

A dicumyl peroxide emulsion as in Example 1 was added to the latex to attain a formulated latex containing 0.1 phr dicumyl peroxide. Also added to the latex was fumed silica (reinforcing agent), added as a 15 weight percent aqueous dispersion (supplied by Cabot Corporation, Boston, Mass., USA, as CABO GUARD T-22) to achieve a level of 3 phr fumed silica.

The glass former was first dipped into an aqueous coagulant solution, which contained 35% calcium nitrate, 0.5% IGEPAL CO-630 surfactant, both by weight, the balance dionized water, then allowed to dry. The former was then dipped in the compounded latex and allowed to dwell in the latex for five seconds, then slowly withdrawn and dried at 60° C. for sixty minutes. After drying, the former with latex film were immersed in a molten salt bath having the same composition as the baths used in the preceding examples, for nine minutes at 350° F. (177° C.). The former and film were then withdrawn from the salt bath, rinsed, stripped, and readied for tensile testing. The resultant latex film was transparent and amber in color.

Tensile measurements were made in accordance with ASTM specification D3492, using three tensile rings, to yield the tensile values that are listed in Table III.

TABLE III

Invention Example - Polychloroprene: Tensile Modulus

| Percent Elongation | Tensile Modulus - Ring 1 (psi) | Tensile Modulus - Ring 2 (psi) | Tensile Modulus - Ring 3 (psi) | Median Tensile Modulus (psi) |
|---|---|---|---|---|
| 50 | 87 | 78 | 82 | 82 |
| 100 | 116 | 108 | 110 | 110 |
| 200 | 150 | 145 | 146 | 146 |
| 300 | 192 | 189 | 188 | 189 |
| 400 | 278 | 279 | 271 | 278 |
| 500 | 519 | 543 | 528 | 528 |
| 600 | 1036 | 1014 | 1076 | 1036 |
| 700 | 2022 | 1979 | 2125 | 2022 |
| At Break (Ultimate Tensile Strength) | 3621 | 3339 | 3254 | 3339 |
| Ultimate Elongation at Break | 787% | 764% | 763% | |

These tensile values are more than sufficient to pass the ASTM standard D-3577-98 for synthetic rubber surgical gloves.

EXAMPLE 4

PROCESS ACCORDING TO THE INVENTION: POLYURETHANE

This example illustrates the process of the present invention as applied to polyurethane, and specifically, in the modification of thermoplastic polyurethane films after the films have been formed.

Two solvent dip molding solutions were prepared. The first consisted of 15 weight percent thermoplastic polyurethane (MORTHANE PS49, Rohm and Haas Company, Chicago Heithts, Ill., USA) and 85 weight percent tetrahydrofuran. A control film (in the form of a condom) was prepared by dipping the form into an organic solution, as described in U.S. Pat. No. 4,954,309, issued Sep. 4, 1990, to McGlothlin et al., entitled "Method of Forming a Polymeric Casing With Textured Surface." After drying, the polyurethane condom thus formed was stripped from the former. The second dip molding solution was formed by adding 0.5 phr dicumyl peroxide to the first solution, and a second dip-molded condom was prepared in a manner essentially identical to the first, except that the dipped and dried condom was then immersed for nine minutes in a molten salt bath (identical to those used in the preceding examples) at 350° F. (177° C.).

Portions of both the control condom and the test condom were subjected to a solvent resistance test. According to this test, both films were immersed in tetrahydrofuran. The control film dissolved entirely when immersed in the tetrahydrofuran, while the second, which had been crosslinked by the dicumyl peroxide treatment, did not dissolve but instead swelled significantly. This test illustrates the improvement in properties of dip-molded articles made of polyurethane (as representative of thermoplastic elastomers in general) as a result of the process of the present invention.

EXAMPLE 5

PROCESS ACCORDING TO THE INVENTION: PREVULCANIZED NATURAL RUBBER LATEX

This example illustrates the process of the present invention applied to two prevulcanized natural rubber latices, one by sulfur and the other by radiation. The sulfur-prevulcanized latex was 60% solids REVULTEX HLA-21 from Revertex Americas, St. Louis, Mo., USA. The radiation-prevulcanized latex was obtained from Guthrie Latex, Inc. Tucson, Ariz., and simply sold as "RVNRL." Both latices are noted for their low levels of residual chemicals and hence their low toxicity profiles. Because of the low toxicity profiles, the tensile strengths of these materials are lower than those of many other natural rubber latices. Standard clear-glass condom formers, 32 mm in diameter, as used in all preceding examples were used as dip formers.

Four compounded latices were used, as follows:

1. REVULTEX HLA-21 (sulfur-prevulcanized latex) as supplied by Revertex Americas.
2. REVULTEX HLA-21 (sulfur-prevulcanized latex) as supplied by Revertex Americas, supplemented with dicumyl peroxide to 1.0 phr.
3. RVNRL as supplied by Guthrie Latex, Inc.
4. RVNRL as supplied by Guthrie Latex, Inc., supplemented with dicumyl peroxide to 1.0 phr.

One condom was formed from each of these three latices, using the coagulant solution and the dipping and drying procedures of Example 3. All were then dried for sixty minutes at 60° C. The condoms formed from latices that did not contain dicumyl peroxide were further dried for 45 minutes at 150° F. (66° C.) in a hot air oven, powdered, stripped, and set aside. The condoms formed from latices that did contain dicumyl peroxide were further processed by immersion in a molten salt bath of the same description as those used in the preceding examples, for nine minutes at 350° F. (177° C.). All four condoms were rinsed, powdered, and stripped.

Tensile values were obtained for all four condoms, using the standard procedures described in the preceding examples. The results are listed in Table IV.

TABLE IV

Invention Example - Prevulcanized Natural Rubber: Tensile Moduli

| Percent Elongation | Sulfur-Prevulcanized Latex (psi) | Radiation-Prevulcanized Latex (psi) | Sulfur-Prevulcanized Latex with Peroxide Post-Cure (psi) | Radiation-Prevulcanized Latex with Peroxide Post-Cure (psi) |
|---|---|---|---|---|
| 50 | 58 | 45 | 63 | 71 |
| 100 | 78 | 61 | 97 | 104 |
| 200 | 115 | 85 | 149 | 161 |
| 300 | 159 | 112 | 204 | 226 |
| 400 | 302 | 180 | 321 | 371 |
| 500 | 711 | 437 | 955 | 910 |
| 600 | 1546 | 1012 | 2498 | 2222 |
| 700 | 2877 | 1898 | n/a | n/a |
| At Break (Ultimate Tensile Strength) | 3384 | 2638 | 4058 | 4741 |
| Ultimate Elongation at Break | 732% | 756% | 665% | 710% |

The notion "n/a" in Table IV denotes "not applicable" since break occurred at or before this elongation, as indicated by the last row.

These results show that the properties of the dip-molded condoms of both methods of prevulcanization, sulfur-based and radiation, are enhanced by postvulcanization in accordance with the present invention.

EXAMPLE 6

PROCESS ACCORDING TO THE INVENTION: ADDITION OF VULCANIZING AGENT BY IMBIBITION FOR SECONDARY POSTVULCANIZATION

This example illustrates that aspect of the present invention in which a vulcanized and fully formed dip-molded article is given a secondary postvulcanization by first immersing the article in a solution of a vulcanizing agent to absorb the agent from the solution and then re-curing the article following the absorption. The rubber material used in this example was synthetic polyisoprene rubber, supplied as a 10% solids solution in n-hexane. The polyisoprene was NATSYN 2200, from Goodyear Tire and Rubber Company, Akron, Ohio, USA, and was dissolved in the hexane by agitating with a medium-shear laboratory mixer. The resulting solution was split into two batches, and the first was supplemented by the addition of dicumyl peroxide to 1.5 phr while the second was supplemented by the addition of dicumyl peroxide to 2.0 phr. Stainless steel dipping mandrels with outside diameters of 0.091 inch (0.23 cm) were dipped in the solutions, withdrawn, air dried and re-dipped in a sequence that was repeated approximately seven times to build up a single wall balloon thickness of approximately 0.010 inch (0.0254 cm). After thorough drying in a warm air oven to remove essentially all of the solvent, the portions of the dipping formers that were coated with the dried mixture of polyisoprene and dicumyl peroxide were immersed in a hot molten salt bath (the same as that used in the preceding examples) for nine minutes at 350° F. (177C.). The resulting balloons were rinsed in water, powdered with corn starch, and removed from the dipping formers. Each balloon was then cut into segments approximately 1 cm in length to form right heart catheter balloons.

Six of the balloons formed from the 1.5 phr dicumyl peroxide dipping solution were immersed for thirty minutes in an imbibing solution consisting of dicumyl peroxide dissolved in ethyl acetate, the solution having a sufficient concentration and volume to raise the dicumyl peroxide content of the balloons by 0.5 phr. The balloons were then removed from the solution and thoroughly air-dried in a warm air oven to remove essentially all ethyl acetate. The balloons were then immersed in a molten salt bath (as described in the preceding examples) for nine minutes at 350° F. (177° C.). The balloons were then removed, rinsed in water, dried, and powdered with corn starch.

A representative balloon from each treatment group was mounted on an inflation test fixture, and subjected to an air pressure burst test to determine the pressure needed to rupture the balloon upon inflation. The results are shown in Table V.

TABLE V

Invention Example - Single-Stage vs. Dual-Stage Postvulcanization Burst Pressures

| Number of Post-Vulcanization Stages | Dicumyl Peroxide Level (phr) | Burst Pressure (psig) |
|---|---|---|
| one | 1.5 | 13.2 |
| one | 2.0 | 15.4 |
| two | 1.5 + 0.5 = 2.0 | 28 |

These results demonstrate that an unexpected improvement in physical properties is achieved by a two-stage postvulcanization achieved by the imbibition of a vulcanizing agent by an already-formed dip-molded rubber article, followed by vulcanization in a hot liquid bath, as compared to a single-stage postvulcanization at the same level of vulcanizing agent.

EXAMPLE 7

COMPARISON USING NATURAL RUBBER LATEX: HOT LIQUID MEDIUM CURE ACCORDING TO THE INVENTION VS. HOT AIR CURE OF PRIOR ART

This example demonstrates the improvement offered by the present invention relative to the hot air curing method of the prior art. Natural rubber latex supplemented with a sulfur-based curing system was used in this comparison.

Natural rubber latex (60% solids) was supplemented with a curing system bearing the name OCTACURE 590 (Tiarco Chemical, Dalton, Ga., USA) in an amount which, according to the supplier, results in a compounded latex containing 2 phr zinc oxide, 1.65 phr sulfur, 0.5 phr zinc-2-mercaptobenzothiazole, and 0.75 phr of an unspecified antioxidant. The latex was degassed, and two condoms were prepared from the latex in the manner described in Example 2, involving the use of the coagulant described in that example. One of the condoms while still on the former was then vulcanized in hot air for 45 minutes at 100° C., and then for an additional sixty minutes at 110° C. The second condom, also while still on the former, was dried for 45 minutes at 100° C., then immersed in a molten salt bath of the same description as those used in the preceding examples for nine minutes at 350° F. (177° C.).

Tensile tests were performed on both condoms in the manner described in Example 2. The test results are listed in Table VI.

TABLE VI

Comparison - Hot Air vs. Molten Salt Bath Postvulcanization Tensile Moduli

| Percent Elongation | Tensile Modulus After Hot Air Cure (psi) | Tensile Modulus After Molten Salt Cure (psi) |
|---|---|---|
| 50 | 42 | 61 |
| 100 | 55 | 86 |
| 200 | 67 | 124 |
| 300 | 82 | 166 |
| 400 | 115 | 223 |
| 500 | 210 | 389 |
| 600 | 425 | 822 |
| 700 | 767 | 1588 |
| 800 | (n/a) | 2802 |
| At Break (UltimateTensile Strength) | 922 | 3550 |
| Ultimate Elongation | 736% | 848% |

The notation "n/a" in Table VI denotes "not applicable" since break occurred at or before this elongation, as indicated by the last row.

These data demonstrate that the present invention is applicable to natural latex rubber without the need for prevulcanization, and it also shows that the process of the invention produces a product whose tensile properties greatly exceed those of corresponding products prepared by processes of the prior art.

EXAMPLE 8

APPLICATION OF THE INVENTION TO LATEX MIXTURES

This example demonstrates the application of the process of the invention to a mixture of latices.

A mixture was prepared by combining equal parts by weight of Shell IR-307 synthetic polyisoprene latex and NEOPRENE 750 polychloroprene latex. The dicumyl peroxide dispersion described in Example 1 was added to achieve a latex containing 0.7 phr dicumyl peroxide. One condom was produced from this latex, using the method described in Example 2, then immersed in a molten salt bath of the same description as those used in the preceding examples for nine minutes at 350° F. (177° C.), then rinsed and powdered. The condom was opaque and amber in color. Test specimens were prepared and tensile modulus measurements were taken as in the preceding examples. The results are listed in Table VII.

TABLE VII

Invention Example - Mixed Latices: Tensile Moduli

| Percent Elongation | Tensile Modulus After Molten Salt Cure (psi) |
|---|---|
| 50 | 60 |
| 100 | 91 |
| 200 | 139 |
| 300 | 200 |
| 400 | 429 |
| 500 | 1076 |
| 600 | 2254 |
| At Break (Ultimate Tensile Strength) | 2550 |
| Ultimate Elongation | 619% |

The foregoing is offered primarily for purposes of illustration. It will be readily apparent to those skilled in the art that the materials and their proportions, as well as the operating conditions, procedural steps and other parameters of the inventions described herein may be further modified or substituted in various ways without departing from the spirit and scope of the invention.

What is claimed is:

1. A method for the preparation of a substantially pore-free article of rubber, said method comprising:
   (a) dipping a forming member in a latex comprising
      (i) a rubber and
      (ii) a vulcanizing agent, said forming member having an outer surface with a contour complementary to that of said article;
   (b) withdrawing said forming member from said latex in such a manner as to leave a film of said latex over said outer surface;
   (c) immersing said forming member with said latex film thereon in a chemically inert liquid bath at a temperature and for a period of time sufficient to cause vulcanization of said rubber by said vulcanizing agent; and
   (d) withdrawing said forming member from said liquid bath and separating said substantially pore-free rubber article from said forming member.

2. A method in accordance with claim 1 in which said rubber is a member selected from the group consisting of natural rubber, polychloroprene, nitrile rubber, polyurethane, styrene block polymer, and butyl rubber.

3. A method in accordance with claim 1 in which said rubber is a polyurethane thermoplastic elastomer.

4. A method in accordance with claim 1 in which said rubber is a polyurethane thermoplastic styrenic block polymer.

5. A method in accordance with claim 1 in which said rubber is a member selected from the group consisting of natural rubber and polychloroprene.

6. A method in accordance with claim 1 in which said liquid bath of step (c) is a member selected from the group consisting of molten inorganic salts, oils, glycols, liquified metals, water, and brine solutions.

7. A method in accordance with claim 1 in which said liquid bath of step (c) is a member selected from the group consisting of molten inorganic salts, silicone oils, and glycols.

8. A method in accordance with claim 1 in which said liquid bath of step (c) is a member selected from the group consisting of molten inorganic salts and mixtures thereof.

9. A method in accordance with claim 8 in which said molten inorganic salts are members selected from the group consisting of nitrates, nitrites, carbonates, sulfates, phosphates, and halides of potassium, sodium and lithium.

10. A method in accordance with claim 1 in which said temperature of step (c) is from about 100° C. to about 350° C.

11. A method in accordance with claim 1 in which said rubber is a member selected from the group consisting of polychloroprene and styrene-butadiene rubber, and said temperature of step (c) is from about 150° C. to about 300° C.

12. A method in accordance with claim 1 in which said rubber is natural rubber, and said temperature of step (c) is from about 150° C. to about 235° C.

13. A method in accordance with claim 1 in which said vulcanizing agent is a member selected from the group consisting of organic peroxides, sulfur-containing compounds, selenium-containing compounds, and tellurium-containing compounds.

14. A method in accordance with claim 1 in which said vulcanizing agent is a member selected from the group consisting of diacyl peroxides, peroxyketals, dialkyl peroxides, mercaptothiazoles, thiuram sulfides, thiuram disulfides, guanidines, zinc dialkyl dithiocarbamates, selecium dialkyl dithiocarbamates, sodium diethyldithiocarbamate, potassium diethyldithiocarbamate, alkyl phenol sulfides, sulfur-containing polymers, and benzothiazyl disulfide.

15. A method in accordance with claim 1 in which said vulcanizing agent is an organic peroxide.

16. A method in accordance with claim 1 in which said vulcanizing agent is a combination of an organic peroxide and a member selected from the group consisting of multi-functional salts of acrylic and methacrylic acids.

17. A method in accordance with claim 1 in which said vulcanizing agent is a dicumyl peroxide.

18. A method in accordance with claim 1 in which said vulcanizing agent is a combination of dicumyl peroxide and zinc dimethacrylate.

19. A method in accordance with claim 1 in which said rubber of step (a) is not vulcanized prior to step (a).

20. A method in accordance with claim 1 further comprising partially vulcanizing said rubber prior to step (a).

21. A method in accordance with claim 20 in which said partial vulcanizing is achieved by high energy irradiation.

22. A method for increasing the tensile strength of an article of vulcanized rubber, said method comprising:
   (a) forming said article by dipping a forming member in a latex comprising
      (i) a rubber and
      (ii) a vulcanizing agent said forming member having an outer surface with a contour complementary to that of said article;

(b) withdrawing said forming member from said latex in such a manner as to leave a film of said latex over said outer surface, thus forming said article;

(c) immersing said article in a solution of a vulcanizing agent to cause said article to absorb said vulcanizing agent from said solution;

(d) immersing said article containing said absorbed vulcanizing agent in a chemically inert liquid bath at a temperature and for a period of time sufficient to cause further vulcanization of said vulcanized rubber by said vulcanizing agent; and (e) withdrawing said article from said liquid bath.

23. A method in accordance with claim 22 in which said vulcanized rubber is vulcanized cis-1,4-polyisoprene.

24. A method in accordance with claim 22 in which said liquid bath is a member selected from the group consisting of molten inorganic salts and mixtures thereof.

25. A method for the preparation of a substantially pore-free article of rubber, said method comprising:

(a) dipping a forming member in a latex comprising
   (i) a rubber and
   (ii) a first vulcanizing agent, said forming member having an outer surface with a contour complementary to that of said article;

(b) withdrawing said forming member from said latex in such a manner as to leave a film of said latex over said outer surface;

(c) immersing said forming member with said latex film thereon in a first chemically inert liquid bath at a temperature and for a period of time sufficient to cause vulcanization of said rubber by said first vulcanizing agent;

(d) withdrawing said forming member with a film of vulcanized rubber thereon from said first chemically inert liquid bath;

(e) immersing said film of vulcanized rubber formed in step (d) in a solution of a second vulcanizing agent to cause said film to absorb said second vulcanizing agent from said solution;

(f) immersing said film containing said absorbed second vulcanizing agent in a second chemically inert liquid bath at a temperature and for a period of time sufficient to cause further vulcanization of said rubber by said second vulcanizing agent; and (g) withdrawing said film from said second chemically inert liquid bath to achieve said substantially pore-free rubber article.

26. A method in accordance with claim 25 in which said rubber is cis-1,4-polyisoprene.

27. A method in accordance with claim 25 in which said liquid bath is a member selected from the group consisting of molten inorganic salts and mixtures thereof.

* * * * *